United States Patent [19]

Ogura et al.

[11] Patent Number: 5,757,355
[45] Date of Patent: May 26, 1998

[54] DISPLAY OF ENLARGED IMAGES AS A SEQUENCE OF DIFFERENT IMAGE FRAMES WHICH ARE AVERAGED BY EYE PERSISTENCE

[75] Inventors: Akihiro Ogura; Masaki Oie, both of Sagamihara; Nobuyoshi Tanaka, Yamato, all of Japan

[73] Assignee: International Business Machines Corporation, Armonk, N.Y.

[21] Appl. No.: 837,957

[22] Filed: Apr. 14, 1997

Related U.S. Application Data

[63] Continuation of Ser. No. 324,281, Oct. 14, 1994, abandoned.

[30] Foreign Application Priority Data

Oct. 14, 1993 [JP] Japan .................. 5-256902

[51] Int. Cl.$^6$ .................. G06F 15/62
[52] U.S. Cl. .................. 345/127; 348/581
[58] Field of Search .................. 345/127, 131; 348/581; 395/139; 382/298, 299

[56] References Cited

U.S. PATENT DOCUMENTS

| | | | |
|---|---|---|---|
| 4,085,420 | 4/1978 | Stukenbrock | 348/804 |
| 4,279,088 | 7/1981 | Hyre | 40/442 |
| 4,686,580 | 8/1987 | Kato et al. | 358/451 |
| 5,287,096 | 2/1994 | Thompson et al. | 345/147 |
| 5,301,021 | 4/1994 | Ogino et al. | 348/564 |
| 5,301,265 | 4/1994 | Itoh | 395/128 |
| 5,329,614 | 7/1994 | Kidd et al. | 395/139 |
| 5,345,542 | 9/1994 | Wye | 395/128 |
| 5,438,635 | 8/1995 | Richards | 382/232 |
| 5,469,223 | 11/1995 | Kimura | 348/581 |
| 5,491,769 | 2/1996 | Moller | 395/139 |
| 5,493,420 | 2/1996 | Kuwamoto et al. | 358/462 |

*Primary Examiner*—Mark R. Powell
*Attorney, Agent, or Firm*—Ronald L. Drumheller

[57] ABSTRACT

Screen interpolation is done without using an expensive line buffer, etc., to enlarge and display an original image without incongruity. Rather than computing an interpolated pixel value as an average of adjacent pixel values and displaying the computed average pixel value in each frame, in accordance with this invention a pixel to be interpolated assumes one of the adjacent pixel values in each frame, but in successive frames assumes different adjacent pixel values in a mix such that the average value of the interpolated pixel over many frames becomes the desired interpolated value. Since successive frames are displayed very rapidly, to the human eye the afterglow (or visual persistence) phenomenon causes the screen to appear as if an enlarged image is being displayed at all times without incongruity (i.e., the varying values of the interpolated pixels are not noticed by the human eye).

4 Claims, 6 Drawing Sheets

FIG.5

| Px00 | Px01 |
|------|------|
| Px10 | Px11 |

FIG.6A

| Px00 | Px00 | Px01 |
|------|------|------|
| Px00 | Px00 | Px01 |
| Px10 | Px10 | Px11 |

FIG.6C

| Px00 | Px00 | Px01 |
|------|------|------|
| Px00 | Px01 | Px01 |
| Px10 | Px10 | Px11 |

FIG.6B

| Px00 | Px01 | Px01 |
|------|------|------|
| Px10 | Px11 | Px11 |
| Px10 | Px11 | Px11 |

FIG.6D

| Px00 | Px01 | Px01 |
|------|------|------|
| Px10 | Px10 | Px11 |
| Px10 | Px11 | Px11 |

| Px00 | Px01 |
|------|------|
| Px10 | Px11 |

FIG.8B
PRIOR ART

| Px00 | Px0D* | Px01 |
|------|-------|------|
| Px0A* | Px0B* | Px0C* |
| Px10 | Px0E* | Px11 |

DISPLAY OF ENLARGED IMAGES AS A SEQUENCE OF DIFFERENT IMAGE FRAMES WHICH ARE AVERAGED BY EYE PERSISTENCE

This is a continuation of application Ser. No. 08/324,281, filed Oct. 14, 1994, now abandoned.

BACKGROUND OF THE INVENTION

1. Field of the Invention

The invention relates to a display method for an image display device and particularly to a display method for an image display device which is suitable for enlarging original images and displaying enlarged images on a flat panel display such as a plasma display or a liquid crystal panel.

2. Related Art

A small light-weight flat panel display is used as a display device for displaying characters, such as data and commands, and images, such as graphics, on personal computers, etc. Liquid crystal displays and plasma displays are known as flat panel displays.

For the resolution of a display device used on personal computers, etc., display specifications are proposed. For example, in the EGA (Enhanced Graphics Adapter), an image can be displayed with 640(horizontal)×350(vertical) pixels, and, in the VGA (Video Graphics Array), an image can be displayed with 640(horizontal)×480(vertical)pixels. Recently, specifications which enable more than 1000 pixels to be displayed horizontally have also become popular and put on the market.

In this connection, if the data of software, whose resolution is lower (for example, 640 pixels horizontally) is displayed as is on a flat panel display whose resolution is higher (for example, 1,000 pixels horizontally), the available flat panel display area is only partially filled because the flat panel has a fixed number of pixels. Therefore, it becomes necessary to adjust data for filling the flat panel display completely, that is, screen interpolation is required to extend a screen image.

The following will briefly explain a conventional screen interpolation method with reference to FIG. 8. Here, a case is given in which data corresponding to a 2×2 pixel window shown in FIG. 8A is interpolated with data to form the 3×3 pixel window data shown in FIG. 8B; that is, the case taken as an example explains screen extension from 1 to 1.5.

In this case, as shown in FIG. 8B, data P×0A*, P×0B*, P×0C*, P×0D*, and P×0E*, such as shown in the figure, are interpolated in five pixel positions at the center. Their data values are as follows:

$$P \times 0A^* = (P \times 00 + P \times 10)/2$$

$$P \times 0B^* = (P \times 00 + P \times 01 + P \times 10 + P \times 11)/4$$

$$P \times 0C^* = (P \times 01 + P \times 11)/2$$

$$P \times 0D^* = (P \times 00 + P \times 01)/2$$

$$P \times 0E^* = (P \times 10 + P \times 11)/2$$

That is, for any interpolation data, the values of the arithmetic means (weighted mean) of data of adjoining pixels are used as interpolation data.

For the conventional technique stated above, a memory device (a frame buffer or a line buffer) is required for storing individual pixel data and surrounding pixel data and a calculation mechanism (hardware or software, such as an adder and divider) is required for operations on interpolation data.

In addition, there is another method of writing the same line data as is on the flat panel side without using a line buffer, etc., but, in such a case, the same data is enlarged as a result. Therefore, the image became irregular or blurred.

The invention has been made based on the consideration of the above points and provides a display method for an image display device which can interpolate a screen without using an expensive line buffer, etc., enlarge original images, and display enlarged images without incongruity.

SUMMARY OF THE INVENTION

A first embodiment of a display method for an image display device is described which comprises the steps of converting a unidirectional frame, in which a data row consisting of n pixel data aligned in one direction is a unit, to a plurality of frames, in which a data row consisting of m pixel data (n<m) is a unit, and for each unit data row of m pixel data, pixel data either before or after a predetermined interpolated position of pixel data of said unit data row is inserted as is into said predetermined interpolated position of pixel data; and repeating and displaying said plurality of frames in order.

A second embodiment of a display method for an image display device is described which comprises the steps of converting a unidirectional frame, in which a data row consisting of n pixel data aligned in one direction is a unit, to a plurality of frames, in which a data row consisting of m pixel data (n<m) is a unit, and, for each unit data row of m pixel data, pixel data either before or after a predetermined interpolated position of pixel data of said unit data row is inserted as is into said predetermined interpolated position of pixel data while converting a unidirectional frame, in which a data row consisting of q pixel data aligned in another direction which is different from said direction is a unit, to a plurality of frames, in which a data row consisting of p pixel data (q<p) is a unit, and, for each unit data row of p pixel data, pixel data either before or after a predetermined interpolated position of pixel data of said unit data row is inserted as is into said predetermined interpolated position of pixel data; and repeating and displaying these frames in order.

A third embodiment of a display method for an image display device is described which comprises the steps of converting a frame, in which a pixel window consisting of four pixels aligned in a matrix 2 rows by 2 columns is a unit, to a plurality of types of frame, in which a pixel window consisting of (a×b) pixels aligned in a matrix a rows by b columns corresponding to each said pixel window is a unit; and repeating and displaying these frames, wherein said frame is converted to a plurality of frames, in which different pixel windows are units, respectively, and, for each pixel window, the pixel data of said each unit pixel window 2 rows by 2 columns is used as is in the positions at the four corners of each unit pixel window a rows by b columns as well as either adjoining pixel data in the same row or in the same column is inserted as is into the interpolated position of pixel data on the four sides and any adjoining pixel data at the four corners is inserted as is into the interpolated position of pixel data other than said positions on the four sides.

A fourth embodiment of a display method for an image display device is described which comprises the steps of converting a frame, in which a pixel window consisting of four pixels aligned in a matrix 2 rows by 2 columns is a unit, to a plurality of types of frames, in which a pixel window consisting of nine pixels aligned in a matrix 3 rows by 3 columns corresponding to each said pixel window is a unit;

and repeating and displaying these frames, wherein said frame is converted to four types of frames, in which different pixel windows are units, respectively, and, for each pixel window, the pixel data of each said unit pixel window 2 rows by 2 columns is used as is in the positions at the four corners of each unit pixel window 3 rows by 3 columns as well as either adjoining pixel data in the same row or in the same column is inserted as is into the interpolated position of pixel data excluding the center interpolated position of pixel data in the second row and any adjoining pixel data at the four corners is inserted as is into the center interpolated position of pixel data in the second row.

In cases where a vertical frame, in which a data row consisting of four pixel data aligned vertically as shown in FIG. 1A is a unit, is extended to a frame, in which a data row consisting of seven pixel data as shown in FIG. 1B is a unit, said frame is converted to a frame in which a data row consisting of seven pixel data is a unit, and, for each unit data row of pixel data, pixel data either before or after an interpolated position of pixel data of the data row is inserted into interpolated positions (marked by an asterisk *), such as shown in FIG. 1C and FIG. 1D, and these frames are alternately displayed on a display device at predetermined (very short) time intervals. Therefore, to the human eye, the afterglow phenomenon causes it to appear as if frames, such as shown in FIG. 2, are displayed at all times. Therefore, even in cases where a frame with a low resolution is extended to a frame with a high resolution without using a line buffer, etc., it becomes possible to extend and display the original image without incongruity, similar to cases in which data of the arithmetic mean is operated on and that data is displayed as interpolated data using a line buffer.

Of course, this relationship can be similarly applied even to cases where a frame in which a plurality of pixels is a unit is extended to a frame in which a plurality of pixels is a unit (extension within a commonsense range).

Moreover, for example, in cases where a horizontal frame, in which a data row consisting of five pixel data aligned horizontally, as shown in FIG. 3A, is a unit, is extended to a frame, in which a data row consisting of seven pixel data, as shown in FIG. 3B, is a unit, said frame is converted to frames, similarly, as shown in FIG. 3C and FIG. 3D, and these frames are alternately displayed on a display device at predetermined (very short) time intervals. Therefore, to the human eye, the afterglow phenomenon causes it to appear as if the frame in which the pixel data is interpolated, shown in FIG. 3E, is displayed at all times. An effect similar to the above can be obtained.

The second embodiment may be used where, for example, frames are converted and displayed horizontally and vertically simultaneously and at predetermined time intervals, repeatedly, one by one. Therefore, even in cases where a frame having two-dimensional directions is extended by a method according to the invention, it becomes possible to extend and display the original image without incongruity.

The third embodiment may be used for a case in which a frame, in which a pixel window consisting of pixel data 2 rows by 2 columns is a unit, is extended to a frame, in which a pixel window consists of pixel data a rows by b columns. The fourth embodiment is one in which the third embodiment is limited. The detailed effects of the third and fourth embodiments will be made clear in the following detailed description of preferred embodiments.

BRIEF DESCRIPTION OF THE DRAWINGS

FIGS. 3A–D illustrates an interpolation method for a data row vertically, and FIG. 3E illustrates the data displayed on a panel display, as it appears to the human eye, as a result;

FIG. 5 shows an example of image data which is output from the image data output section in FIG. 4;

FIGS. 6A–D illustrate image data sequentially and alternately output from the data output section in FIG. 4;

FIG. 7 shows a drawing illustrating the interpolated positions of image data of a 3×3 pixel window; and FIGS. 8A–B illustrates a conventional screen interpolation method.

DESCRIPTION OF THE PREFERRED EMBODIMENTS

Embodiments of the invention will be explained now with reference to FIGS. 4 to 7.

Figure 1A:
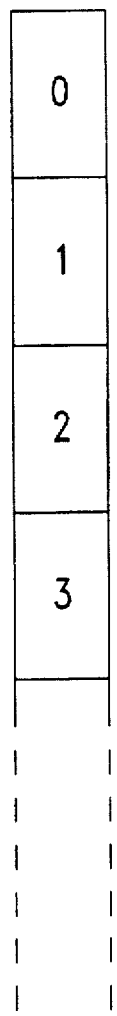
FIGS. 1A–D shows the effect of the invention and are used for explaining the interpolation method for a vertical data row.
Figure 1B:
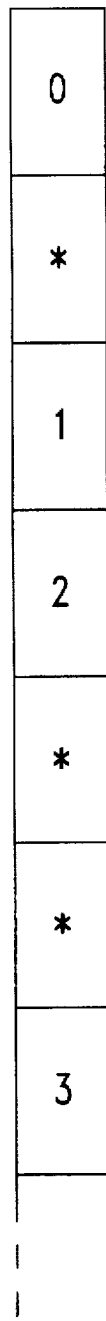
Figure 1C:
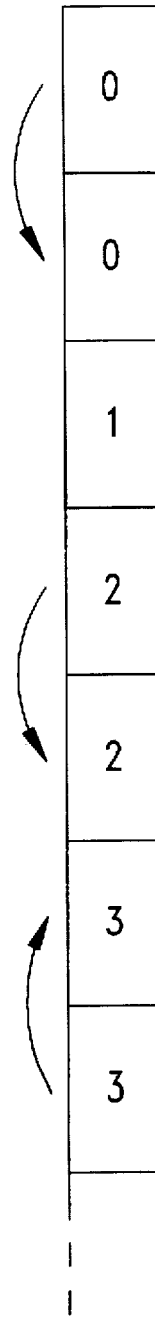
Figure 1D:
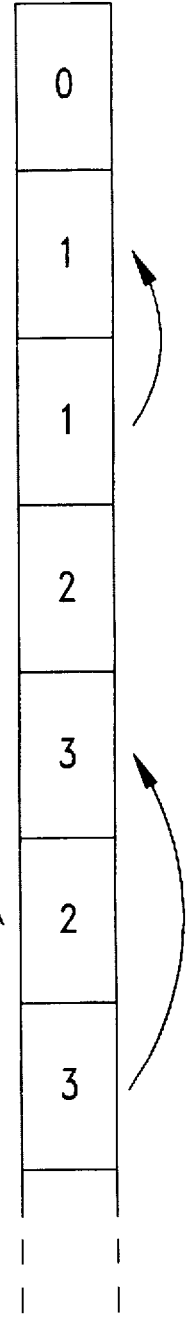
Figure 2:
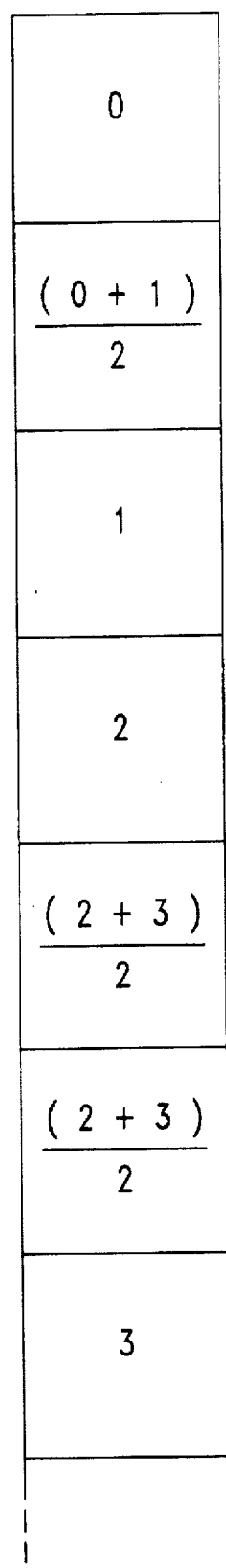
FIG. 2 illustrates data obtained by the method of FIG. 1 displayed on the panel display, as it appears to the human eye.
Figure 3A:
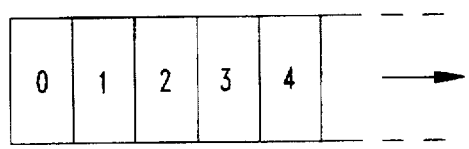
FIGS. 3A–E illustrates the effect of the invention.
Figure 3B:
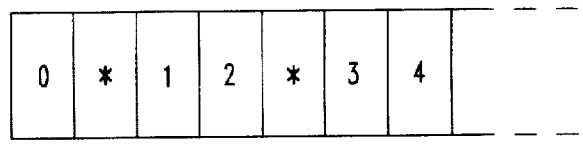
Figure 3C:
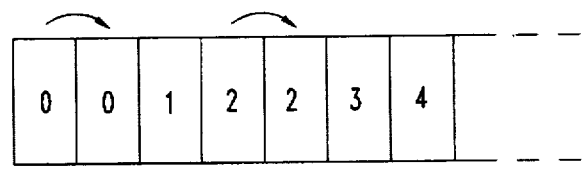
Figure 3D:
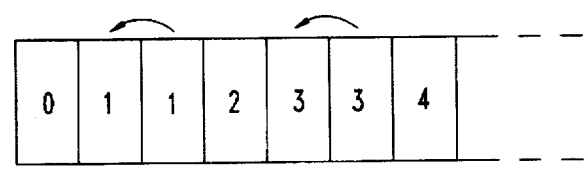
Figure 3E:
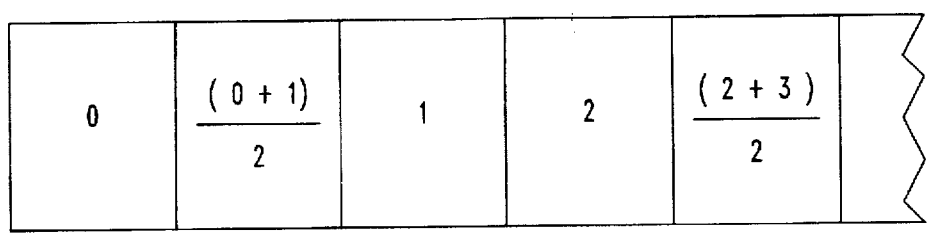
Figure 4:
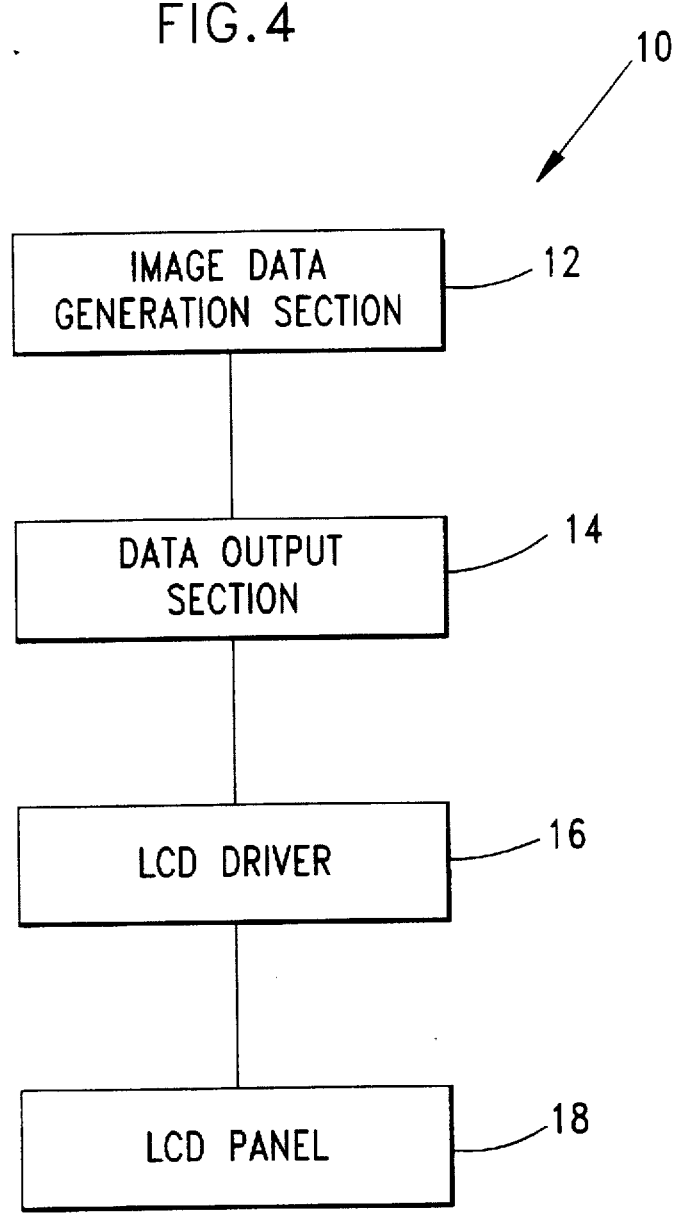
FIG. 4 is a schematic block diagram showing the configuration of the main section of an image display device for implementation of a display method in accordance with the invention.

FIG. 4 shows a conceptual drawing of the configuration of the main component of the image display device 10 for implementation of the invention. This image display device 10 consists of an image data generation section 12 for generating image data, a data output section 14 for outputting image data in which the generated image data is input by the input of said image data, pixel data is inserted into predetermined interpolated positions of pixel data, and said image data is extended for a predetermined pixel value, and an LCD driver 16 for driving an LCD panel 18 which is a flat panel with the input from this data output section.

Here, the LCD panel 18 has 960×720 pixels and the image data generation section 12 generates standard image data 640×480 pixels. In this case, the magnification of extension is 960/640=1.5 horizontally and 720/480=1.5 vertically. Since the magnification both horizontally and vertically is 1.5, it is sufficient if data is extended 1.5 times the original one.

The effect of the described embodiment will be explained below.

Image data 2×2 pixels, such as shown in FIG. 5, is generated in the image data generation section 12, in correspondence to a 3×3 pixel window of the LCD panel 18. When this image data is input to the data output section 14, in said data output section 14, image data is inserted into predetermined interpolated positions of pixel data (interpolated positions of pixel data at the center cross-shaped positions of a 3×3 pixel window illustrated by asterisks * in FIG. 7) and image data, such as shown in FIGS. 6A–D, corresponding to a 3×3 pixel window, are output one by one at very short time intervals repeatedly.

Here, the interpolation will be described in further detail with reference to FIGS. 6A–D. In a matrix corresponding to this pixel window, pixel data of the first column in the first row and the third column in the first row (pixel data before and after a predetermined interpolated position horizontally) is alternately inserted into the second column in the first row, pixel data of the first column in the first row and the first column in the third row (pixel data before and after a predetermined interpolated position vertically) is alternately inserted into the first column in the second row, pixel data of the third column in the first row and the third column in the third row (pixel data before and after a predetermined interpolated position vertically) is alternately inserted into the third column in the second row, pixel data of the first column in the third row and the third column in the third line (pixel data before and after a predetermined interpolated position horizontally) is alternately inserted into the second column in the third row, and pixel data at the adjoining four corners (the first column in the first row, third column in the third row, third column in the first row, and the first column in the third row) is inserted one by one into the second column in the second row at the center.

In this way, the LCD panel 18 is driven by the LCD driver 16 based on the data for four images which are sequentially and alternately output from the data output section 14 (four types of frame data in which data which corresponds to a 3×3 pixel window shown in FIGS. 6A–D are units, respectively). The frame images in which the data, such as shown in FIGS. 6A–D, are units, respectively, are sequentially and repeatedly displayed on the LCD panel 18 at very short time intervals.

As a result, to the human eye, the afterglow phenomenon causes it to appear as if the image of the frame, in which said 3×3 pixel data, shown in FIG. 8B, which is interpolated with the arithmetic mean of adjoining pixel data, is a unit, is displayed in succession.

A well-known method, for example, Bresenham's method, etc., can be used to determine the interpolated position of data for actual data extension. In addition, the screen can be interpolated using different scaling factors by selecting an appropriate size (a×b: where a≧3, b≧3, but a and b are not 3 at the same time) of pixel window. In this case, a frame is converted to a plurality of frames, in which different pixel windows, where pixel data of a unit pixel window 2 rows by 2 columns is inserted as is into the positions at the four corners of a unit pixel window a rows by b columns as well as either of the adjoining pixel data in the same row or in the same column is inserted as is into the interpolated position of pixel data on the four sides and either of the adjoining pixel data at the four corners is inserted as is into the interpolated position of pixel data other than said positions on the four sides, are units, thereby obtaining an effect similar to said embodiment.

As explained above, according the embodiment, an original image can be enlarged and displayed without using a memory device, such as a frame buffer or line buffer, for holding image data, and also without using a calculation mechanism for operating on interpolation data without incongruity, similarly to the conventional method which uses these.

Furthermore, the invention can also be applied effectively to image display for a flat panel display, such as an LCD panel, and also to a video controller, etc.

As explained above, according to the invention, a screen can be interpolated without using an expensive line buffer, etc., and an original image can be enlarged and displayed without incongruity. This provides an excellent effect not provided in conventional devices. Moreover, in this way, it becomes easy to use a display device for the same flat panel display, etc., for both specifications for displaying an image with 640 pixels horizontally and for displaying an image with 1,000 pixels horizontally, for example.

We claim:

1. In a display method for enlarging the number of pixels of an original image frame, wherein added pixels are inserted between original pixels of the original image frame for display on an image display device having a larger number of pixels in at least one direction than the original image frame, a method for determining values for the added pixels without performing pixel value interpolation calculations, comprising the steps of:

converting the original image frame into a series of different image frames, each image frame in the series being formed by inserting added pixels into the original image frame at the same positions in each image frame of the series; and displaying the series of different image frames sequentially on an image display device, the series of different image frames when averaged by eye persistence forming an image having a larger number of pixels than the original image frame in at least one direction, wherein each added pixel in any one of said different image frames has a value equal to the value of one of the original pixels located adjacent to said each added pixel, and a same added pixel in different ones of said different image frames has different values.

2. A method as defined in claim 1 wherein said same added pixel in said different ones of said different image frames has values selected so as to form an average value for said same added pixel that effectively interpolates by eye persistence between the values of two or more original pixels located adjacent to said same added pixel.

3. A method of displaying a frame of image data having a first plurality of original pixels in each row thereof on an image display device having at least a second plurality of pixels in each row thereof, the second plurality being larger than the first plurality, comprising the steps of:

converting the frame of image data having the first plurality of original pixels in each row thereof into a sequence of successive frames of expanded pixel data, each frame in the sequence having a second plurality of pixels in each row thereof, the second plurality being larger than the first plurality, a corresponding row of pixels in each frame of the sequence corresponding to a row of the frame of image data and being formed by inserting an added pixel between selected pairs of original pixels in said corresponding row of the frame of image data, the original pixels of each said corresponding row in the sequence being positioned identically and not varying in value in successive frames of the sequence, but the added pixels between said selected pairs of original pixels having values that vary from one frame of the sequence to another, each said added pixel between two original pixels having a value equal to one of the original pixels on one side of said each added pixel in one frame of said sequence and having a value equal to another one of the original pixels on another side of said each added pixel in another frame of said sequence, whereby upon display of said sequence of frames on said image display device, said added pixels are averaged by eye persistence to produce an apparent average value for each said added pixel between the values of the original pixels adjacent thereto.

4. A method of displaying a frame of image data having a first plurality of original pixels in each column thereof on an image display device having at least a second plurality of pixels in each column thereof, the second plurality being larger than the first plurality, comprising the steps of:

converting the frame of image data having the first plurality of original pixels in each column thereof into a sequence of successive frames of expanded pixel data, each frame in the sequence having a second plurality of pixels in each column thereof, the second plurality being larger than the first plurality, a corresponding column of pixels in each frame of the sequence corresponding to a column of the frame of image data and being formed by inserting an added pixel between selected pairs of original pixels in said corresponding column of the frame of image data, the original pixels of each said corresponding column in the sequence being positioned identically and not varying in value in successive frames of the sequence, but the added pixels between said selected pairs of original pixels having values that vary from one frame of the sequence to another, each said added pixel between two original pixels having a value equal to one of the original pixels on one side of said each added pixel in one frame of said sequence and having a value equal to another one of the original pixels on another side of said each added pixel in another frame of said sequence, whereby upon display of said sequence of frames on said image display device, said added pixels are averaged by eye persistence to produce an apparent average value for each said added pixel between the values of the original pixels adjacent thereto.

* * * * *